US005285627A

United States Patent [19]
Lösel et al.

[11] Patent Number: 5,285,627
[45] Date of Patent: Feb. 15, 1994

[54] METHOD FOR OPERATING A GAS AND STEAM TURBINE PLANT AND A PLANT FOR PERFORMING THE METHOD

[75] Inventors: Georg Lösel, Uttenreuth; Werner Schwarzott, Grossenseebach, both of Fed. Rep. of Germany

[73] Assignee: Siemens Aktiengesellschaft, Munich, Fed. Rep. of Germany

[21] Appl. No.: 916,027

[22] Filed: Jul. 17, 1992

[30] Foreign Application Priority Data

Jul. 17, 1991 [DE] Fed. Rep. of Germany ....... 4123731

[51] Int. Cl.$^5$ ............................................. F02C 6/00
[52] U.S. Cl. ................................ 60/39.02; 60/39.12; 60/39.182
[58] Field of Search ................. 60/39.02, 39.12, 39.182

[56] References Cited

U.S. PATENT DOCUMENTS

| | | | |
|---|---|---|---|
| 2,675,672 | 4/1954 | Schorner | 60/39.182 |
| 3,873,845 | 3/1975 | Osthaus | 60/39.12 |
| 4,261,166 | 4/1981 | Mayrhofer | 60/39.02 |
| 4,288,979 | 9/1981 | Liljedahl et al. | 60/39.12 |
| 4,424,668 | 1/1984 | Mukherjee | 60/39.182 |
| 4,468,923 | 9/1984 | Jorzyk et al. | 60/39.02 |
| 4,693,072 | 9/1987 | McLean et al. | 60/39.02 |
| 4,729,217 | 3/1988 | Kehlhofer | 60/39.02 |
| 5,044,163 | 9/1991 | Bruckner et al. | 60/39.182 |
| 5,079,909 | 1/1992 | Bruckner et al. | 60/39.12 |

FOREIGN PATENT DOCUMENTS

| 0410111 | 1/1991 | European Pat. Off. | |
| 0211511 | 12/1983 | Japan | 60/39.12 |

Primary Examiner—Richard A. Bertsch
Assistant Examiner—Michael I. Kocharov

[57] ABSTRACT

A gas and steam turbine plant includes a coal gasification plant, a gas turbine connected downstream of the coal gasification plant, a steam turbine having a water-steam loop and a steam generator connected downstream of the gas turbine. The steam generator includes a preheater connected to the water-steam loop, a heater of a high-pressure stage connected downstream of the preheater, and a heater of a low-pressure stage connected upstream of the preheater. An outflow line leads into the coal gasification plant and is connected to the water-steam loop downstream of the preheater, as seen in water flow direction. A heat exchanger has a primary side integrated with the water-steam loop between the low-pressure stage and the high-pressure stage and a secondary side connected parallel to the outflow line. A method for operating the gas and steam turbine plant includes generating steam in the water-steam loop with heat contained in an expanded operating fluid of the gas turbine, heating the working fluid with gas, drawing preheated water for a coal gasification process from the water steam loop, and altering the temperature of the partial quantity in a loop coupled with the water-steam loop for adjusting a set-point temperature of the drawn water by mixing it with a partial quantity of the drawn water.

6 Claims, 3 Drawing Sheets

METHOD FOR OPERATING A GAS AND STEAM TURBINE PLANT AND A PLANT FOR PERFORMING THE METHOD

The invention relates to a method for operating a gas and steam turbine plant, in which heat contained in an expanded operating fluid of a gas turbine is used to generate steam in a water-steam loop of a steam turbine, gas is used to heat the operating fluid, and preheated water is drawn from the water-steam loop for a coal gasification process. The invention is also directed to a gas and steam turbine plant operating according to the method.

In a gas and steam turbine plant that can be selectively operated with coal gas or with natural gas or oil, the heat contained in the gas turbine exhaust gas is used to generate steam for the steam turbine. The water-steam loop of the steam turbine typically includes two pressure stages, each being made up of a preheater along with an evaporator and a superheater. In a plant with integrated coal gasification, preheated water is typically drawn from the water-steam loop to cool crude gas produced in the coal gasification. Steam which is generated there is returned to the water-steam loop. In a natural-gas-operated plant, drawing water and feeding in steam in this way is unnecessary.

In the event that the heating surfaces of the preheater, evaporator and superheater disposed in the steam generator are constructed for coal gas operation, the heating surfaces of the high-pressure preheater or economizer, in particular, are too large for the natural gas operation. As a result, with natural gas operation, since the water-steam quantity is too low in comparison with coal gas operation, a danger exists of evaporation of the water in the economizer, so that superheating and/or corrosion damage to the heating surfaces can occur. By comparison, in the event that the heating surfaces in the steam generator are constructed for natural gas operation, the heating surfaces of the economizer are too small for coal gas operation.

In a gas and steam turbine plant known from Published European Application No. 0 410 111 A1, heating surfaces in a steam generator are constructed for coal gas operation. In partial-load operation, similar to the case with natural gas operation, where the water-steam quantity in the water-steam loop is relatively small in comparison with full-load operation, the quantity of water flowing through the heating surfaces of the preheater or economizer is increased enough to ensure that no evaporation can occur there. A partial quantity of feedwater that is not needed for the steam generation is expanded in two succeeding expansion stages and next, the thus-formed steam is superheated in the steam generator and delivered to the steam turbine. However, thermodynamic losses occur in each expansion stage, so that the overall efficiency of the plant drops.

It is accordingly an object of the invention to provide a method for operating a gas and steam turbine plant and a plant for performing the method, which overcome the hereinafore-mentioned disadvantages of the heretofore-known methods and devices of this general type and in which the highest possible overall efficiency is obtained both in coal gas and natural gas operation as well as in partial-load operation. In such a plant, the object is to attain these goals with the least possible engineering effort and expense.

With the foregoing and other objects in view there is provided, in accordance with the invention, a method for operating a gas and steam turbine plant having a gas turbine and a steam turbine with a water-steam loop, which comprises generating steam in the water-steam loop with heat contained in an expanded operating fluid of the gas turbine; heating the working fluid with gas; drawing preheated water for a coal gasification process from the water steam loop; and altering the temperature of the partial quantity in a loop coupled with the water-steam loop for adjusting a set-point temperature of the drawn water by mixing it with a partial quantity of the drawn water.

In accordance with another mode of the invention, there is provided a method which comprises drawing the water from a high-pressure preheater (economizer) having heating surfaces with a primary side connected to a steam generator and a secondary side connected to the water-steam loop.

In accordance with a further mode of the invention, there is provided a method which comprises heating the partial quantity of the drawn water by indirect heat exchange with water from a water-steam drum of a high-pressure stage. This is done in the event that the heating surfaces in the steam generator, in particular those of the economizer, are constructed for natural gas operation.

The set-point temperature of the water drawn for the coal gasification process is thus attained by decoupling heat from the high-pressure stage, having evaporator heating surfaces in which sufficient heat is generated.

In accordance with an added mode of the invention, there is provided a method which comprises heating the partial quantity of the drawn water by indirect heat exchange with water from a water-steam drum of a low-pressure stage. This is done in the event that the heating surfaces in the steam generator, particularly those of the economizer, are constructed for coal gas operation.

As a result, on one hand, in natural gas operation, evaporation from the economizer heating surfaces is attained by giving up heat from the water that is heated in the economizer at increased pressure, to the low-pressure stage, so that steam is additionally generated there. On the other hand, in coal gas operation, evaporation of the water on the way to the coal gasification process is reliably avoided by cooling down the drawn water. Moreover, the capacity of the drawn water to hold heat from the coal gasification process is increased.

In accordance with an additional mode of the invention, there is provided a method which comprises returning the water heated in the coal gasification process to the water-steam loop.

With the objects of the invention in view, there is also provided a gas and steam turbine plant, comprising a coal gasification plant; a gas turbine connected downstream of the coal gasification plant; a steam turbine having a water-steam loop; a steam generator connected downstream of the gas turbine, the steam generator including a preheater (economizer) connected to the water-steam loop, a heater of a high-pressure stage connected downstream of the preheater, and a heater of a low-pressure stage connected upstream of the preheater; an outflow line leading into the coal gasification plant and being connected to the water-steam loop downstream of the preheater, as seen in water flow direction; and and a heat exchanger having a primary side integrated with the water-steam loop in a region between the low-pressure stage and the high-pressure stage and a secondary side connected parallel to the outflow line.

In accordance with another feature of the invention, there is provided a mixing apparatus, preferably a three-way valve, in the outflow line, the heat exchanger discharging into the mixing apparatus. This is done in order to adjust or regulate the set-point temperature of the drawn water.

When the heating surfaces of the economizer are constructed for natural gas operation, in accordance with a further feature of the invention, the heat exchanger is disposed in a water-steam drum of the high-pressure stage.

In contrast, in accordance with an added feature of the invention, when the heating surfaces of the economizer are constructed for natural gas operation, the heat exchanger is advantageously disposed in a water-steam drum of the low-pressure stage.

In accordance with a concomitant feature of the invention, the heat exchanger is connected on the outlet side to the water-steam drum of the high pressure stage.

The advantages attained with the invention are in particular that even under extreme operating conditions, for instance in different load ranges, both in coal gas and natural gas operation, little or no throttling losses that impair the thermodynamic cycle process arise in the heating surfaces of the steam generator. As a result, only operating states that are within allowable limits arise. At the transition from natural gas operation to coal gas operation and vice versa, a gradual heat displacement takes place through the heat exchanger.

Other features which are considered as characteristic for the invention are set forth in the appended claims.

Although the invention is illustrated and described herein as embodied in a method for operating a gas and steam turbine plant and a plant for performing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
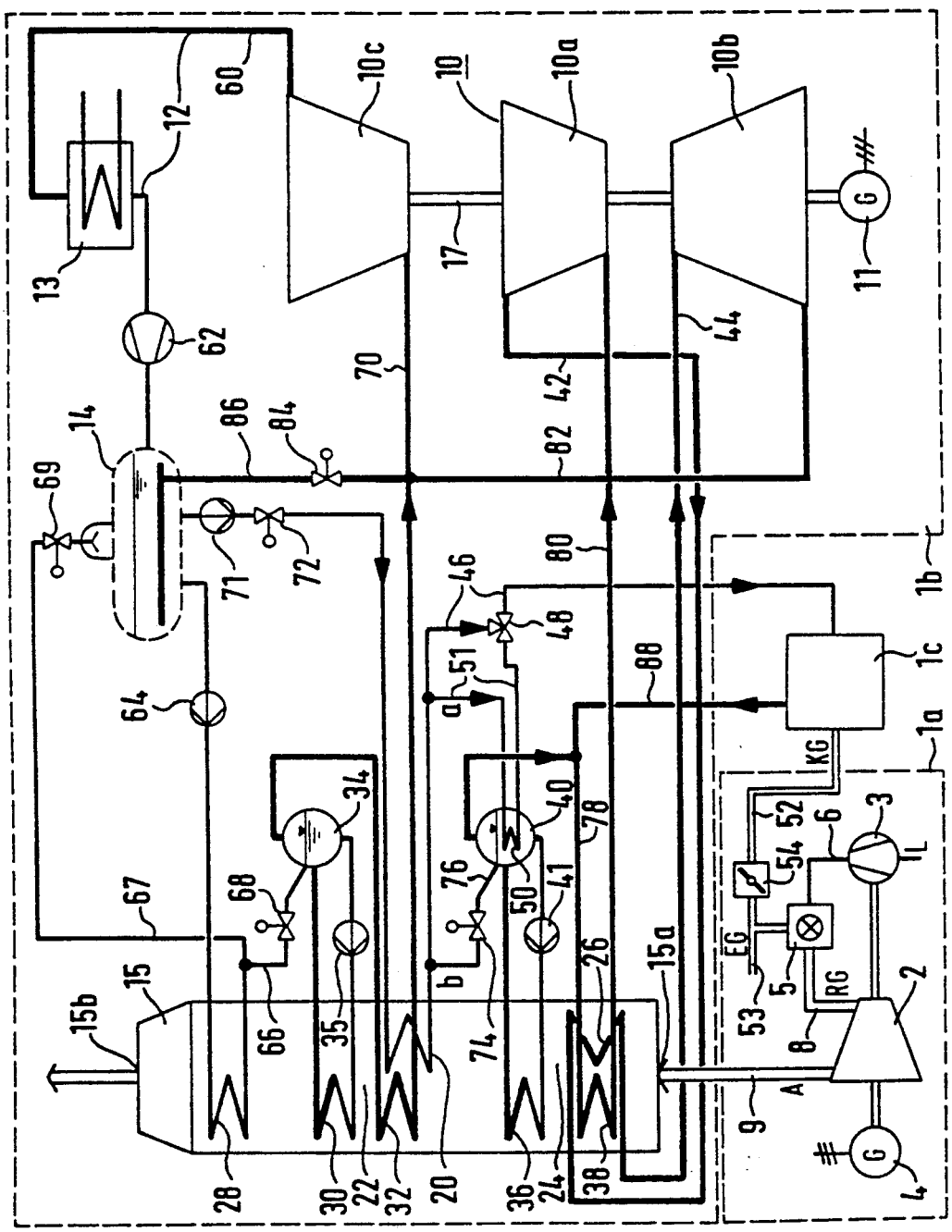
FIG. 1 is a schematic circuit diagram of a gas and steam turbine plant having a heat exchanger in a water-steam drum of a high-pressure stage.

Referring now in detail to the figures of the drawing, in which elements corresponding to one another are provided with the same reference numerals in all of the drawing figures, and first, particularly, to FIG. 1 thereof, there is seen a gas and steam turbine plant which includes a gas turbine plant 1a and a steam turbine plant 1b. The gas turbine plant 1a is connected downstream of a coal gasification plant 1c. The gas turbine plant 1a includes a gas turbine 2 with an air compressor 3 coupled thereto and a generator 4, as well as a combustion chamber 5 being connected upstream of the gas turbine 2 and being connected to a fresh air line 6 of the air compressor 3.

The steam turbine plant 1b includes a steam turbine 10 with a generator 11 coupled thereto and a water-steam loop 12 which includes a condenser 13 connected downstream of the steam turbine 10, a feedwater container 14 connected downstream of the condenser 13 and a steam generator 15.

The steam turbine 10 includes a high-pressure part 10a, a medium-pressure part 10b and a low-pressure part 10c, which drives the generator 11 through a common shaft 17.

In order to supply exhaust gases AG from the gas turbine 2 to the steam generator 15, an exhaust gas line 9 is connected to one inlet 15a of the steam generator 15. The exhaust gas AG leaves the steam generator 15 through an outlet 15b thereof in the direction of a non-illustrated chimney.

The steam generator 15 includes a high-pressure preheater or economizer 20, a low-pressure heater 22, a high-pressure heater 24, and an intermediate superheater 26.

The low-pressure heater 22 includes a preheater 28, an evaporator 30 and a superheater 32, which form a low-pressure stage of the water-steam loop 12, together with the low-pressure part 10c of the steam turbine 10 and a water-steam drum 34.

The high-pressure heater 24 includes an evaporator 36 and a superheater 38, which form a high-pressure stage of the water-steam loop 12, together with the high-pressure part 10a of the steam turbine 10, the economizer 20 and a water-steam drum 40.

The intermediate superheater 26 has an input side connected to the high-pressure part 10a of the steam turbine 10 through a steam line 42 and an output side connected to the medium-pressure part 10b of the steam turbine 10 through a steam line 44.

An outflow line 46 is connected to the water-steam loop 12 downstream of the economizer 20, as seen in the flow direction of the water, and leads through a mixing apparatus in the form of a three-way valve 48 into the coal gasification plant 1c. A heat exchanger 50 has a primary side disposed in the water-steam drum 40 and a secondary side connected to the outflow line 46.

When the gas and steam turbine plant is in operation, the combustion chamber 5 is selectively supplied with fuel in the form of coal gas KG from the coal gasification plant 1c through a supply line 52, or with natural gas EG through a supply line 53. Upon a transition from natural gas operation to coal gas operation, a flap 54 is actuated. In the exemplary embodiment, the flap 54 is located in the supply line 52.

The fuel KG or EG is combusted in the combustion chamber 5 along with compressed fresh air L from the air compressor 3. Hot flue gas RG which is produced in the combustion serves as a working fluid and is carried into the gas turbine 2 through a flue gas line 8. There it expands, and in so doing drives the gas turbine 2. The gas turbine 2 in turn drives the air compressor 3 and the generator 4. The hot exhaust gas AG leaving the gas turbine 2 is carried through the exhaust gas line 9 into the steam generator 15, where it is used to generate steam for the steam turbine 10. To this end, the exhaust gas flow and the water-steam loop 12 are linked together in countercurrent fashion.

The steam emerging from the low-pressure part 10c of the steam turbine 10 is delivered through a steam line 60 to the condenser 13, where it condenses. The condensate is pumped into the feedwater container 14 by a condensate pump 62. From the feedwater container 14, water is pumped by a circulation pump 64 into the preheater 28 of the low-pressure heater 22 and it is preheated there. The water that is preheated in the preheater 28 flows through a line 66, in which a valve 68 is incorporated, into the water-steam drum 34. There the water is evaporated with the aid of the evaporator 30. To that end, with the aid of a pump 35, water is pumped out of the water-steam drum 34, into the evaporator 30 and from there back into the water-steam drum 34. An adjustable partial quantity of the preheated water flows back into the feedwater container 14 through a line 67, in which a valve 69 is incorporated. The steam which is separated out in the water-steam drum 34 is delivered to the superheater 32 and from there it flows, in the superheated state, through a steam line 70 into the low-pressure part 10c of the steam turbine 10.

The water from the feedwater container 14 that is supplied to the high-pressure stage, is first pumped through a high-pressure pump 71 and a valve 72, into the high-pressure preheater or economizer 20 and is heated there. A partial quantity b of the heated water, which quantity is adjustable with a valve 74, flows through a line 76 into the water-steam drum 40. Next, the water is evaporated with the aid of the evaporator 36, and to this end water from the water-steam drum 40 is pumped by a pump 41 into the evaporator 36 and from there back into the water-steam drum 40. The steam that is formed in the water-steam drum 40 flows through a line 78 into the superheater 38 and from there it flows, in the superheated state, through a steam line 80 into the high-pressure part 10a of the steam turbine 10. The steam that is expanded in the high-pressure part 10a flows through the line 42 into the intermediate superheater 26 and from there into the medium-pressure part 10b of the steam turbine 10. The steam which is expanded in the medium-pressure part 10b of the steam turbine 10 flows through a steam line 82, through the steam line 70 and into the low-pressure part 10c of the steam turbine 10 along with the steam from the low-pressure superheater 32. Some of the steam flowing out of the medium-pressure part 10b of the steam turbine 10 flows into the feedwater container 14 through a steam line 86, when a valve 84 is open.

In the exemplary embodiment of FIG. 1, the heating surfaces of the high-pressure preheater or economizer 20 are constructed for natural gas operation. In coal gas operation, the temperature of the water drawn from the water-steam loop 12 through the outflow line 46 is adjusted by mixing it with a partial quantity a of the drawn water that is carried through the heat exchanger 50 in a loop 51. In this process the temperature of the partial quantity a is increased by absorbing heat generated in the evaporator 36, so that by suitable adjustment of the three-way valve 48, a mixed temperature corresponding to the set-point temperature is established on the downstream side of the valve 48. The water, which is adjusted to the desired temperature, flows through the line 46 into the coal gasification plant 1c and there it is evaporated by indirect heat exchange with the crude gas produced in the coal gasification process. The steam generated in the coal gasification plant 1c flows through a line 88, which is connected to the line 78, and into the superheater 38, so that it is thus returned to the water steam loop 12. The plant described above for the exemplary embodiment of FIG. 1 is suitable, in particular, for retrofitting an existing plant that is constructed for natural gas operation, with the coal gasification plant 1c.

Figure 2:
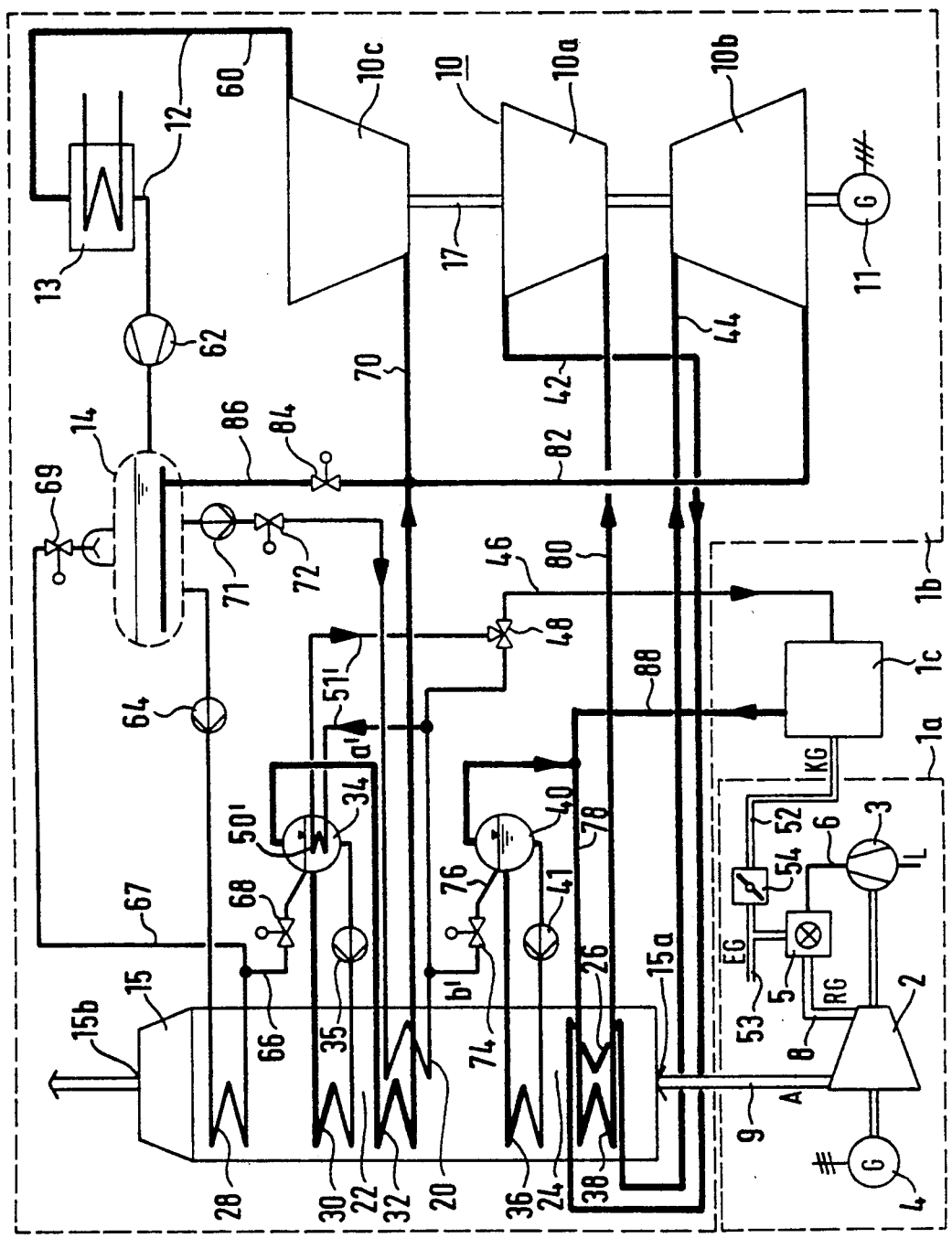
FIG. 2 is a circuit diagram of a plant in accordance with FIG. 1, with a heat exchanger in a water-steam drum of a lower pressure stage.

In the exemplary embodiment of FIG. 2, the heating surfaces of the economizer or high-pressure preheater 20 are constructed for coal gas operation. Otherwise, the gas turbine plant 1a with the coal gasification plant 1c connected thereto and the steam turbine plant 1b, that are shown schematically in FIG. 2, have the same structure as shown in the schematic view of FIG. 1. In this case, a primary side of a heat exchanger 50' is disposed in the water-steam drum 34 and it is integrated into the low-pressure stage of the water-steam loop 12.

In coal gas operation, water that is drawn from the water-steam loop 12 downstream of the economizer 20, as seen in flow direction of the water, and is delivered to the coal gasification plant 1c through the outflow line 46, is cooled down by giving up excess heat to the low-pressure stage. To that end, a partial quantity a' of the drawn water, which is carried to a loop 51', is altered by indirect heat exchange with the water of the water-steam drum 34, in such a way that by mixing the drawn water with the partial quantity a', with suitable adjustment of the valve 48, the set-point temperature is established in the line 46 on the downstream side of the valve 48.

Due to the especially good heat transfer from water to water or from water to steam, the dimensions of the heat exchanger 50', like those of the heat exchanger 50 of FIG. 1, can be selected to be so small that the heat exchanger 50 of FIG. 1 or 50' of FIG. 2, can be installed with little effort or expense in an already existing drum 34 or 40.

In natural gas operation, evaporation from the heating surfaces of the economizer 20 is attained by giving up heat to the low-pressure stage, from the water heated in the economizer 20 at high pressure. Steam is additionally generated there. The transition from natural gas operation to coal gas operation is effected by gradual heat displacement through the heat exchanger 50'.

In coal gas operation, evaporation of the water in the outflow line 46 is reliably avoided by cooling down the drawn water. Moreover, the capacity of the drawn water to hold heat from the crude gas produced in the coal gasification process is increased.

Figure 3:
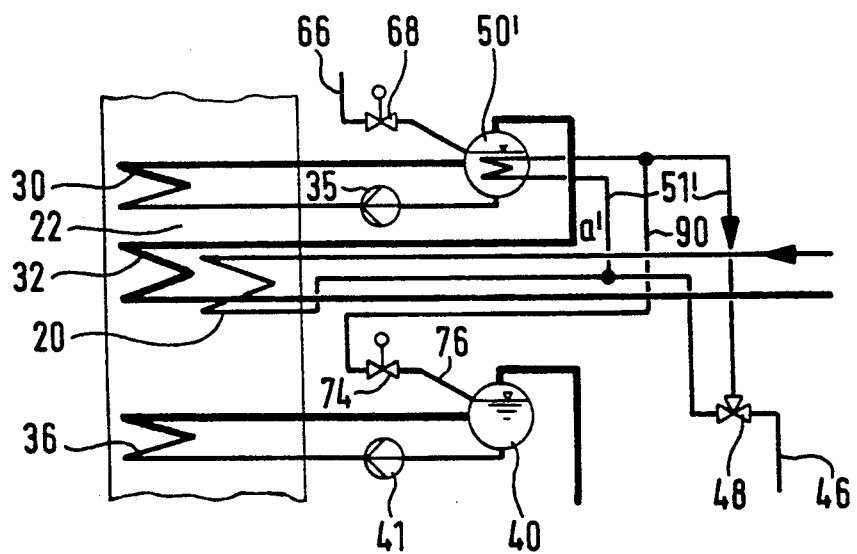
FIG. 3 is a circuit diagram of a portion of a plant according to FIG. 2, with a further circuit of the heat exchanger.

In the plant shown in fragmentary form in FIG. 3, the outlet side of the heat exchanger 50' communicates with the water-steam drum 40 of the high-pressure stage, through a line 90 discharging into the line 76. In contrast to the exemplary embodiment of FIG. 2, in which only the partial flow a' of the drawn water carried in the loop 51' is cooled down, in the exemplary embodiment of FIG. 3 all of the water flowing into the water-steam drum 40 of the high-pressure stag is cooled down.

The circuit of the heat exchanger of FIG. 2 has an advantage over the variant of FIG. 3, which is that the heat exchanger 50' only needs to be constructed for the partial flow a' carried in the loop 51'. In the variant of FIG. 2, a maximum of high-pressure steam is generated, so that particularly high efficiency is attained. On the other hand, in contrast to the variant of FIG. 3, the valve 74 then needs to be constructed for regulating water in the vicinity of the boiling point.

Upon a transition from one type of gas to the other, for instance at the transition from coal gas operation to natural gas operation, in which a water-steam quantity that is reduced by the water quantity to be supplied to the coal gasification has to be moved, it is suitable to raise the pressure in the economizer 20, so that only water flows to the heat exchanger 50'.

As with natural gas operation, in partial-load operation, in which heat that is increased in amount in the steam generator 15 reaches the region of the heating surfaces of the economizer 20, evaporation in the economizer 20 is avoided by incorporating the heat exchanger 50 of FIG. 1 or 50' of FIGS. 2 and 3 into the water-steam loop 12

We claim:

1. A method for operating a gas and steam turbine plant having a coal gasification process producing a coal gas, a gas turbine and a steam turbine with a water-steam loop, which comprises:

generating steam in the water-steam loop with heat contained in an expanded operating fluid of the gas turbine;

drawing preheated water for a coal gasification process from the water steam loop from cooling coal gas produced in the coal gasification process; and altering the temperature of a partial quantity of water drawn in the drawing step in a loop coupled with the water-steam loop by indirect heat exchange with water from a water-steam drum of a high-pressure stage for adjusting a set-point temperature of the drawn water by mixing it with the partial quantity of the drawn water.

2. The method according to claim 1, which comprises drawing the water from a high-pressure preheater having heating surfaces with a primary side connected to a steam generator and a secondary side connected to the water-steam loop.

3. A method for operating a gas and steam turbine plant having a coal gasification process producing a coal gas, a gas turbine and a steam turbine with a water-steam loop, which comprises:

generating steam in the water-steam loop with heat contained in an expanded operating fluid of the gas turbine;

drawing preheated water for a coal gasification process from the water steam loop for cooling coal gas produced in the coal gasification process; and altering the temperature of a partial quantity of water drawn in the drawing step in a loop coupled with the water-steam loop by indirect heat exchange with water from a water-steam drum of a low-pressure stage for adjusting a set-point temperature of the drawn water by mixing it with the partial quantity of the drawn water.

4. The method according to claim 1, which comprises returning the water heated in the coal gasification process to the water-steam loop.

5. The method according to claim 3, which comprises drawing the water from a high-pressure preheater having heating surfaces with a primary side connected to a steam generator and a secondary side connected to the water-steam loop.

6. The method according to claim 3, which comprises returning the water heated in the coal gasification process to the water-steam loop.

* * * * *